No. 621,987.  
G. E. ZINN.  
DENTAL DISK HOLDER.  
(Application filed Sept. 16, 1897.)
Patented Mar. 28, 1899.
(No Model.)
Fig. I
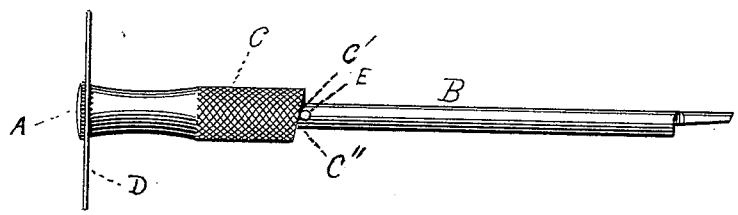
Fig. II
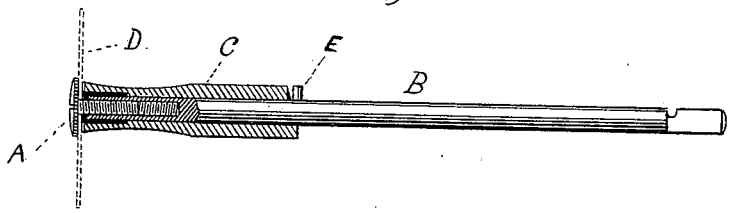
WITNESSES  
John McCulver  
R. P. Johnson Jr.  
John H. Curtis
George Edwin Zinn  
INVENTOR
THE NORRIS PETERS CO., PHOTO-LITHO., WASHINGTON, D. C.

UNITED STATES PATENT OFFICE.

GEORGE EDWIN ZINN, OF CHICAGO, ILLINOIS.

DENTAL DISK-HOLDER.

SPECIFICATION forming part of Letters Patent No. 621,987, dated March 28, 1899.

Application filed September 16, 1897. Serial No. 651,847. (No model.)

*To all whom it may concern:*

Be it known that I, GEORGE EDWIN ZINN, a citizen of the United States, residing at Chicago, county of Cook, and State of Illinois, have invented a new and useful Dental Disk-Holder, of which the following is a specification.

My invention relates to a mandrel for carrying a rotating disk made of sandpaper or other grinding or polishing material to be used by dentists or others for the purpose of polishing fillings in teeth and other metalwork.

The object of the mandrel is to provide an instrument that, first, holds the disk firmly; second, will not tear the disk when brought under severe tension; third, so grips the disk that it will rotate either way without loosening, and, fourth, will be easy to manipulate. I obtain these objects by the mechanism illustrated in the accompanying drawings.

Figure 1 is a perspective view of the holder carrying a disk. Fig. 2 is a sectional view showing the screw A screwed to place in the arm B and the incasing of the arm B in the sleeve C.

The disk or wheel D is held by the screw A, being passed through the hole in the center and screwed into the arm B. The disk or wheel is held from rotating on the screw A by the sleeve C. As soon as the screw is run down the disk strikes the toothed end of the sleeve C, which turns the sleeve until the inclined plane C' of the opposite end of the sleeve strikes the pin E. This inclined plane exerts a force on the sleeve C toward the disk D, which grips the disk between the toothed end of the sleeve and the screw-head, absolutely preventing any rotation. The mandrel may be rotated in the opposite direction by turning the sleeve in the opposite direction until the other side of the inclined plane C'' strikes the pin E. The force of the pin against the inclined plane then exerts a force to grip the disk similar to that heretofore described. Without the sleeve C this force would loosen the screw A, as in the ordinary screw-mandrel now used; but on this the pin E turns the sleeve and the sleeve grips and turns the disk. The inclined plane C' and C'' being greater than that of the screw-head, it tends to force the sleeve farther axially than a similar turn of the screw would permit. The screw thereby acts as a block and prevents any turning.

What I claim as my invention, and desire to secure by Letters Patent, is—

The combination in a dental disk-holder of the rotating shaft the headed screw entering the same and the sleeve rotating upon the shaft between a lug on the shaft and the screw-head, said sleeve bearing an inclined surface on one end which works against said lug, and acts when turned in either direction as a clamp to lock the disk between the opposite end of the sleeve and the screw-head, substantially as described and shown by the model.

GEORGE EDWIN ZINN.

Witnesses:
  R. P. JOHNSON, Jr.,
  JOHN H. CURTIS.